Patented May 12, 1931

1,805,104

UNITED STATES PATENT OFFICE

ELLIS WATMOUGH REED-LEWIS, OF DETROIT, MICHIGAN, ASSIGNOR TO THE SUPER CEMENT CO., A CORPORATION OF MICHIGAN

PORTLAND CEMENT AND PROCESS FOR PRODUCING THE SAME

No Drawing. Application filed August 11, 1927. Serial No. 212,357.

My invention relates to a new and useful improvement in a Portland cement and the process for producing the same.

It is an object of the present invention to provide a cement of this class in which the binding qualities will be raised to the highest degree, and in which the maximum amount of strength may be afforded.

It is another object to provide a cement of this class in which, after the cement has set, there will be a minimum amount of free lime.

Another object is the provision of a cement having as one of the ingredients sufficient free chemically active silica to combine with the free lime when water or other moistening ingredients are added to the cement.

It is another object to provide a cement which will assure a structure, when the cement has set, which will be chemically safe to a high degree, that is, less readily acted upon by active agents, such as water, and particularly sulphur water.

It is another object to provide a cement which, when set, will constitute a relatively insoluble compound.

Another object is the provision of a cement which will for fireproofing purposes be of maximum efficiency.

Another object is the provision of a cement in which the maximum amount of cementing qualities may be attained.

Another object is the provision of a process for producing the type of cement mentioned herein.

The present invention is the outgrowth of the use of and frequent experiments with a cement which is now commercially known in the United States as supercement, and which is manufactured primarily in accordance with the disclosure of United States Letters Patent No. 1,214,910 issued February 6th, 1917 to J. F. Goddard. In the supercement the ingredients used comprise a clinker mixed with gypsum and tannic acid. Although the present invention has resulted from the handling and experimenting with the supercement referred to, it may also be used with other grades and qualities of Portland cement, although with perhaps less efficient results than when used with the supercement. Where ordinary Portland cement is used it has been noted that various forms of chemically active silica may be combined partially with the calcium oxide liberated by the Portland cement during hydration, forming a calcium silicate which is more stable under certain conditions than would have been the calcium hydroxide otherwise formed.

However, where supercement is used it has been discovered that in the hydration liberated calcium is present in a colloidal form more chemically active than is the case with ordinary Portland cement and that in consequence a more efficient combination may be effected between various forms of silica and the calcium oxide liberated through the hydration of supercement than would result from the mixture of the same forms of silica with ordinary Portland cement.

It has further been discovered that this desirable combination of various forms of silica with the calcium liberated through the hydration of supercement can be further stimulated and rendered more effective by adjusting the proportion of such silica to the chemical requirements of the particular supercement under consideration, and by intimately grinding the two together in such proportions.

Cement produced according to this method is found to possess qualities of waterproofing and strength exceeding those of any known kind of cement, either the Portland cement or the supercement, when these known types of cement are mixed with chemically active silica. Consequently, the concrete resulting from the present process is remarkably resistant to all forms of exposure which ordinarily tend to destroy the stability and cohesion of concrete in which the cement is used.

As is well known cement which is used for forming concrete structures consists of fused combinations which are all anhydrous and with many various combinations in the cement appear tri-calcium silicate and di-calcium silicate. It is also well known that in the hydration of this cement the tri-calcium silicate will liberate two molecules of calcium oxide, while the di-calcium silicate will liberate one molecule of calcium oxide. It is also well known that the proportions of the tri-calcium silicate and the di-calcium silicate which appear in the cement vary over wide limits so that in carrying out the present process the proportions of these ingredients are important factors.

The solution, in carrying out the process in order to arrive at the product desired, is the addition to the ground clinker of sufficient chemically active silica to properly combine with the liberated lime or calcium oxide whch appears in the hydrated cement. It has been discovered that for this purpose an admixture of trass, blast furnace slag, diatomaceous earth, and other ingredients consisting in whole or in part of chemically active silica may be introduced and used efficiently when intimately mixed or ground with the cement clinker and calcium sulphate. When super cement is used for carrying out the process the calcium sulphate will of course have incorporated in it tannin or tannic acid or a tannin waterproofing agent as disclosed in the patent referred to. The process, therefore, consists in mixing with the ground cement clinker and calcium sulphate having incorporated in it tannin or tannic acid or a tannin waterproofing agent of predetermined amount of chemically active silica. When this predetermined amount of chemically active silica, which is dependent upon the chemical constituents of the cement clinker, is added, there is provided a cement which when hydrated will possess little, if any, free lime, the liberated calcium oxide combining with the chemically active silica so that a maximum cementing effect is produced.

The results obtained with the supercement being superior to the results obtained with ordinary Portland cement when the chemically active silica is added thereto, is believed due principally to the fact that the tannic acid is incorporated in the supercement. Therefore, the addition to the ordinary cement clinker of a reactive agent which may react upon the silica to maintain the silica chemically active and roused from its dormant state, should it be in one, so that it will combine with the calcium oxide, will effect results superior to the results obtained by a mixture in which this reactive agent is not present, and for the purpose of this disclosure tannic acid is cited as such a reactive agent.

Having thus described my invention what I claim as new and desire to secure by Letters Patent is:

1. A Portland cement consisting of a ground clinker and gypsum, said gypsum having tannin incorporated therein, and a quantity of chemically active silica substantially sufficient to combine with the calcium oxide liberated upon the hydration of the mixture.

2. A method of making Portland cement comprising mixing the clinker with gypsum previously treated or incorporated with tannic acid and mixing therewith a quantity of chemically active silica sufficient to combine with substantially all of the calcium oxide liberated upon hydration of the cement.

3. The process of mixing with a Portland cement consisting of ground clinker and colcium sulphate having tannin incorporated in it of a predetermined amount of chemically active silica, depending upon the chemical structure of the clinker.

4. A cement consisting of a ground clinker; calcium sulphate; tannic acid; and a predetermined amount of chemically active silica sufficient to combine with the liberated lime upon hydration.

In testimony whereof I have signed the foregoing specification.

ELLIS WATMOUGH REED-LEWIS.